May 6, 1947.      H. C. OTTE      2,420,092
BARREL PLANTER
Filed July 27, 1945      2 Sheets-Sheet 1
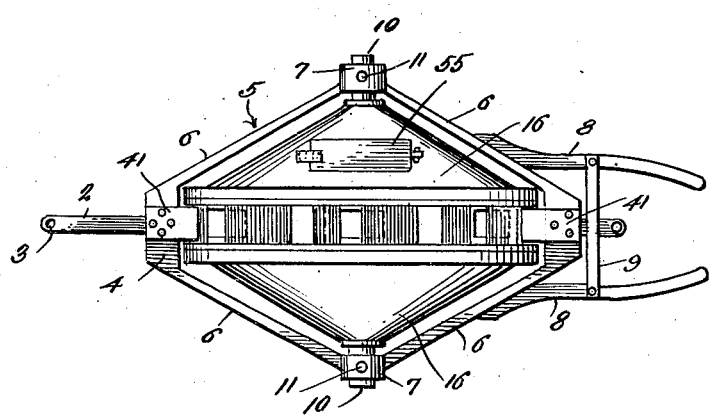
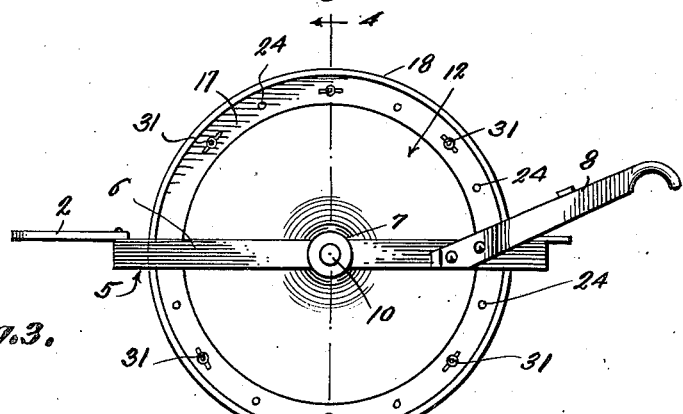
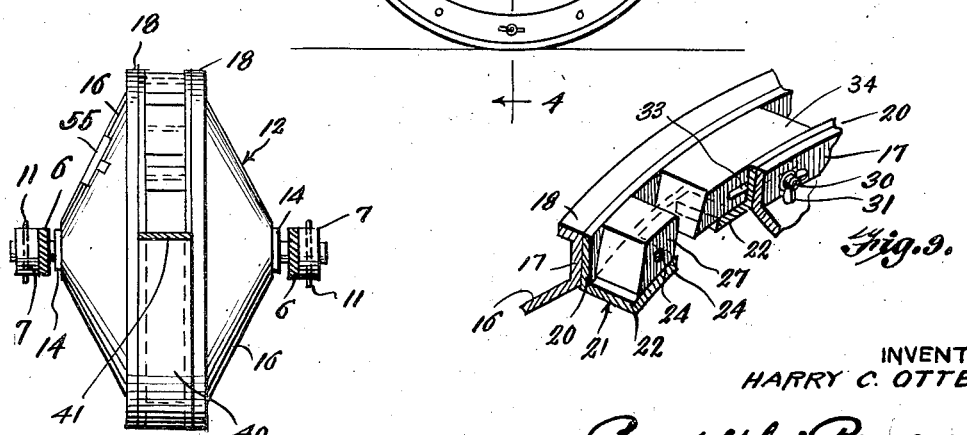
INVENTOR
HARRY C. OTTE
BY Randolph & Beavers
ATTORNEY May 6, 1947. H. C. OTTE 2,420,092
BARREL PLANTER
Filed July 27, 1945 2 Sheets-Sheet 2
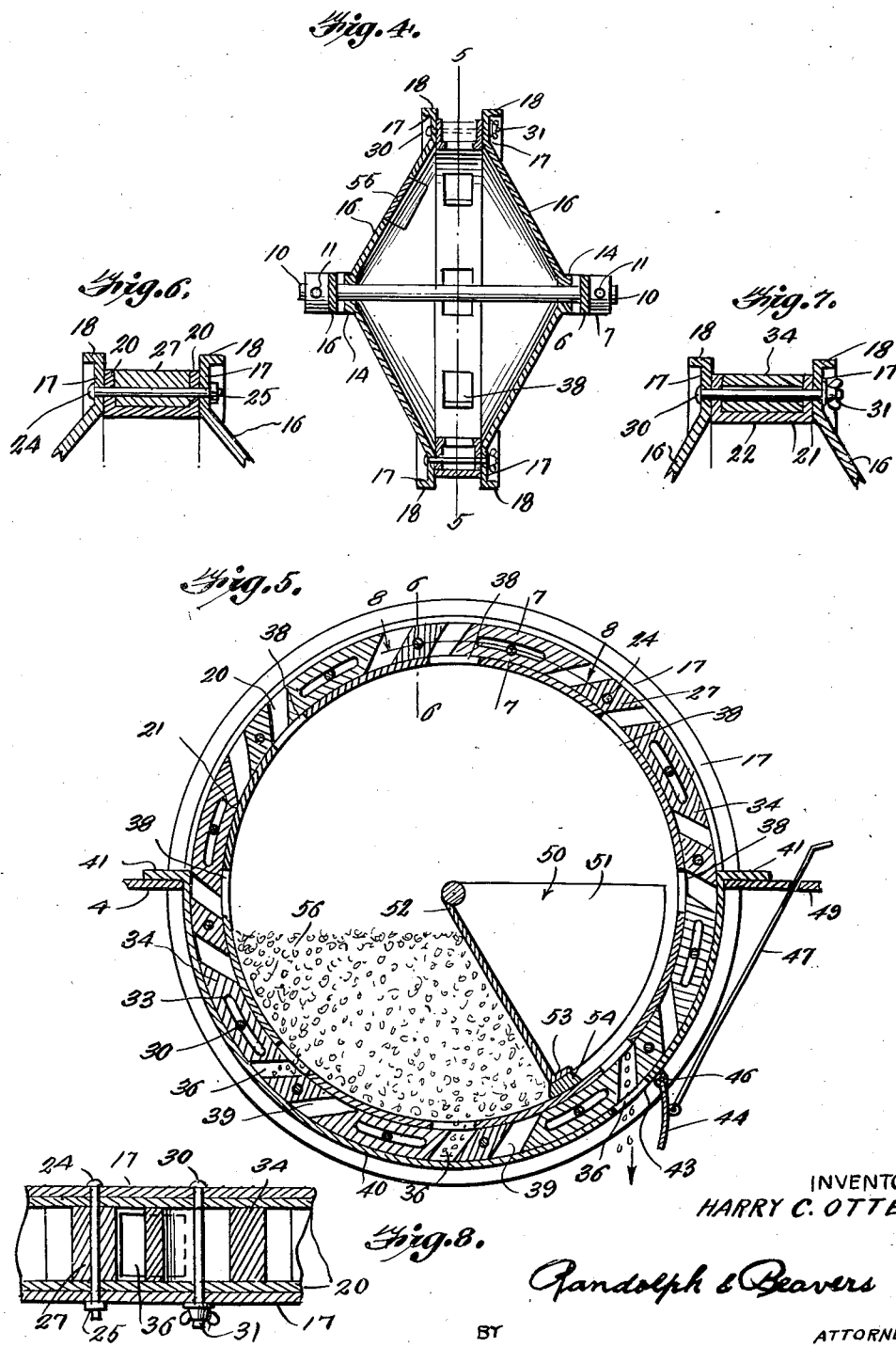
INVENTOR
HARRY C. OTTE
BY Randolph & Beavers
ATTORNEY Patented May 6, 1947

2,420,092

UNITED STATES PATENT OFFICE 2,420,092

BARREL PLANTER

Harry C. Otte, Brookhaven, Miss.

Application July 27, 1945, Serial No. 607,287

1 Claim. (Cl. 111—74)

This present invention relates to planters of the barrel type.

The primary object of the invention is the provision of a planter comprising a barrel part which may be rolled over the ground to be seeded and will drop seed in measured quantities and at spaced points.

Another object of the invention is the provision of a planter of the class described and including means for varying the quantity of seed dropped and for varying the distance between the points at which seed is dropped.

Another object of the invention is the provision of a planter of simple, sturdy and economical construction.

With these and other objects in view the invention resides in the novelty of construction, combination and arrangement of parts specifically hereinafter described and claimed in the appended claim.

For a full understanding of the invention reference is had to the accompanying drawing illustrating the preferred embodiment of my invention and in which—

Figure 1 is a top plan view of the preferred embodiment of my invention;

Figure 2 is a side elevation;

Figure 3 is a vertical transverse section;

Figure 4 is a central vertical transverse section on line 4—4 of Figure 2;

Figure 5 is an enlarged central vertical longitudinal section on line 5—5 of Figure 4;

Figure 6 is an enlarged radial detail section on line 6—6 of Figure 5;

Figure 7 is an enlarged radial detail section on line 7—7 of Figure 5;

Figure 8 is an enlarged cylindrical section on line 8—8 of Figure 5.

Figure 9 is a fragmentary perspective and sectional view of the peripheral portion of the assembly.

In the drawing in which like characters of reference designate like or similar parts, numeral 2 denotes a strap having at its front end an opening 3 for the hitching of a draft animal and being secured at the rear end to the forward plate portion 4 of a frame generally indicated by 5 and also including members 6 which are at their front ends attached to or integral with the front portion 4 and extend rearwardly therefrom in diverging relation. The rear section of the substantially symmetrical frame is a duplicate of the frame section described and illustrated and its parts are therefore indicated by the same reference characters. The rear ends of the rearwardly diverging side members 6 on either side and the forward ends of the rearwardly converging side members are each connected to opposite sides of bosses 7. To the rear end portion of either rear side member 6 is secured a rearwardly and upwardly extending handle 8. These handles are connected by a brace 9.

The bosses receive an axle 10 and are secured thereto by cotter pins 11. Upon the axle is rotatably mounted a drum or barrel generally denoted by 12 which includes a pair of spaced hubs 14. From the inner side of either hub extends a conical shell portion 16 which terminates at its inner base portion in a flange 17 disposed parallel to the hubs and carrying upon its outer end a cylindrical tread flange 18 intended to roll over the ground to be seeded. The flanges 17 of the shell are spaced from one another and each contact the outer side of a flange 20 of a cylindrical channel member 21 including a cylindrical web 22 connected to the inner ends of the flanges. The flanges 17 and 20 have a plurality of spaced sets of registering openings, each set for a bolt 24 having a nut 25 bearing against the outer sides of one of the flanges 17 (Figure 6). Each bolt is also inserted in a hole formed in a fixed block 27 which fits into the channel and has a rhomboid cross section at right angles to the axle (Figure 5).

The flanges 17 and 20 are also provided with a plurality of spaced sets of registering holes for bolts 30 which carry each a wing nut 31. These holes and their bolts are located between a pair of the other holes for bolts 24. Each bolt 30 passes through a longitudinal slot 33 in a block 34 movable in the channel and longer than the blocks 27 and also of rhomboid cross section taken at right angles to the axle. Each block 27 defines with either neighbouring block 34 a chordal space or pocket 36 the width of which depends on the position of the bolt 30 in the slot of the block 34.

The cylindrical web of the channel is provided with a plurality of spaced seed openings 38 which register more or less with the inner end of one of the chordal spaces 36 according to the position of the wing nut bolt in the slot of the movable block bounding the pocket. The pocket 36 with which an opening 38 registers is that one bounded by a fixed block and the nearest movable block in a clockwise direction. The inner end of the other pocket 39 between a fixed block and the nearest movable block in a counterclockwise direction is covered by the web of the channels.

A semi-circular band 40 surrounds the lower half of the barrel described and terminates in horizontal front and rear portions 41 which are attached to and supported by the respective frame plates 4. The rear quadrant of this band has a hole 43 which may be closed by a door 44 hinged to the band rearwardly of the hole at 46. A rod 47 is pivoted with its forward end to the outer surface of the door and extends rearwardly and upwardly through an opening in a guide plate 49 which is secured to or integral with the rear frame plate 4 and in which the rod is held by friction or other conventional means in a position in which the door is closed or in a position in which the same is closed. When a pocket 36 registers with the band opening 43, it is substantially vertically disposed (Figure 5) and is emptied of all seed.

Numeral 50 is a partition comprising spaced sector plates 51 connected at the center to the axle and extending parallel to a corresponding portion of the lower rear quadrant of either of the conical shells (Figure 5). The forward edges of the sector plates are connected by a triangular web 52 which has at the bottom a rearwardly and upwardly extending segmental flange 53 which supports an outwardly, downwardly and rearwardly extending brush 54. The same wipes any seed above an opening in the channel web off and prevents the passage of any seed not in a channel opening and pocket beyond and to the right of it.

The conical shell to the right (looking forwardly) has an opening closed by a door 55 which may be opened to fill the planter with seed 56 (Figure 5).

The distance between the points where seed is to be dropped may be varied. The lowest measure of this distance equals the spacing between seed pockets 36, each of which is formed by a fixed block and the nearest movable block in a clockwise direction.

The other pocket 39 bounded by a movable block and the nearest fixed block in a counterclockwise direction is dead or lacking communication with the interior of the barrel owing to the web of the channel. By placing every second movable block against its fixed neighbour, in a clockwise direction the distance of seeding may be doubled and only four pockets are operative. The distance may be quadrupled by making only two seed pockets operative. The distance may also be multiplied with eight, by closing all seed pockets but one.

The transverse width of each pocket may also be varied to vary the amount of seed dropped. If all seed pockets are opened to the limit a continuous flow of seed through the opening 43 will result.

While I have described the preferred embodiment of my invention in its specific details and illustrated the same in the accompanying drawing, I desire it to be understood that this disclosure is a mere example or illustration of my invention, and not a limitation thereof. Changes or modifications of these details may therefore be resorted to without a departure from the spirit or scope of the invention as defined in the appended claim.

What I claim and desire to secure by Letters Patent is:

A planter comprising, a frame, a seed barrel journaled within the frame and supporting the same and including spaced, flanged tread means, channel means opening outwardly secured to the barrel between the flanges of the tread means, a plurality of holes in the web of the channel, a plurality of spaced fixed blocks in the channel, an equal plurality of spaced adjustable blocks, each between a pair of adjacent fixed blocks and defining with the nearest fixed block in a counterclockwise sense a pocket of adjustable size communicating at its inner end with a hole, a band fixed to the frame and encircling the lower half of the pockets to close the outer ends thereof, controllable aperture means in the band for successive registry with a pocket.

HARRY C. OTTE.

REFERENCES CITED

The following references are of record in the file of this patent:

UNITED STATES PATENTS

| Number | Name | Date |
|---|---|---|
| 204,671 | Kelley | June 11, 1878 |
| 331,885 | Hunter | Dec. 8, 1885 |
| 535,432 | Wilson | Mar. 12, 1895 |
| 788,475 | Kennedy | April 25, 1905 |
| 788,665 | Michell | May 2, 1905 |